United States Patent [19]
Daly et al.

[11] Patent Number: 5,987,169
[45] Date of Patent: Nov. 16, 1999

[54] METHOD FOR IMPROVING CHROMATIC TEXT RESOLUTION IN IMAGES WITH REDUCED CHROMATIC BANDWIDTH

[75] Inventors: Scott J. Daly, Kalama; Jack Van Oosterhout, Camas, both of Wash.; William C. Kress, Portland, Oreg.

[73] Assignee: Sharp Laboratories of America, Inc., Camas, Wash.

[21] Appl. No.: 08/920,624

[22] Filed: Aug. 27, 1997

[51] Int. Cl.$^6$ .................................................. G06K 9/00
[52] U.S. Cl. ........................... 382/167; 358/520; 348/631
[58] Field of Search .................................. 382/162, 166, 382/167, 165; 358/517, 518, 520, 521, 523, 527, 529, 530; 348/631, 606

[56] References Cited

U.S. PATENT DOCUMENTS

| | | | |
|---|---|---|---|
| 4,337,479 | 6/1982 | Tomimoto et al. | 348/628 |
| 4,593,310 | 6/1986 | Songer | 348/631 |
| 4,930,007 | 5/1990 | Sugiura et al. | 358/530 |
| 4,974,071 | 11/1990 | Maeda | 358/539 |
| 5,012,329 | 4/1991 | Lang et al. | 348/606 |
| 5,124,786 | 6/1992 | Nikoh | 348/645 |
| 5,150,203 | 9/1992 | Fairhurst | 358/518 |
| 5,430,464 | 7/1995 | Lumelsky | 345/191 |
| 5,483,361 | 1/1996 | Shimizu | 358/529 |
| 5,488,670 | 1/1996 | Suzuki et al. | 382/165 |
| 5,552,825 | 9/1996 | Talluri | 348/222 |
| 5,751,845 | 5/1998 | Dorff et al. | 382/167 |
| 5,848,180 | 12/1998 | Coleman | 382/162 |

OTHER PUBLICATIONS

Switkes et al., Contrast Dependence and Mechanisms of Masking Interactions Among Chromatic and Luminance Grating, J. Opt. Soc. Am., vol. 5, No. 7, pp. 1149–1162, Jul. 1988.

Primary Examiner—Amelia Au
Assistant Examiner—Jingge Wu
Attorney, Agent, or Firm—Robert D. Varitz, PC

[57] ABSTRACT

A method for improving chromatic text resolution includes transforming a color image signal into chrominance (C1, C2) image signal components and a luminance (L) image signal component. A mask is created for a selected image object from the luminance image signal components. The C1 and C2 image signal components are modified by the mask into new image signal components, $C1_{NEW}$, $C2_{NEW}$, respectively. The new image signal components are transformed, with L, into a new color image signal that does not have chromatic blur.

13 Claims, 5 Drawing Sheets

METHOD FOR IMPROVING CHROMATIC TEXT RESOLUTION IN IMAGES WITH REDUCED CHROMATIC BANDWIDTH

FIELD OF THE INVENTION

This invention relates to improvements in the resolution of color images, and specifically to improvements in text resolution in images produced by color printers or in other color image displays.

BACKGROUND OF THE INVENTION

There exists a problem in displaying images of text, particularly text displayed in saturated colors, on certain light colored or white backgrounds. This problem occurs when chromatic subsampling or other chromatic spatial band width reduction is used in images containing text or other fine graphical line objects. The resulting chromatic blur is most visible when the text is on a white background. It is significant that the visible chromatic blur that results from chromatic subsampling is not present, in either chrominance or luminance, for normally captured images of objects, people or scenes.

One way to represent a color image is by way of representing the luminance of the image in terms of lightness (L*), which ranges from black to white, and the chrominance (a*, b*), which determines the color content and saturation of an image from no color to saturated color, as well as the mix of colors. The luminance and chrominance content of an image, and more precisely, of a given pixel of a digitized image, may be described as L*a*b*. Alternately, the luminance and chrominance may be generally represented by L, C1, C2, where C1 and C2 are the two chrominance components, which may be a* and b* in the L*a*b* color system, U and V of the YUV color system, or I and Q of the YIQ color system. Other chrominance components may be used and may be generalized as C1 and C2. It is the chrominance factor which tends to blur when saturated colors are displayed on a light background.

In the field of image representation, and particularly in the field of digital copiers, images may be compressed for transmission between the image generation source, such as a scanner or digital camera, and the printer. The compressed image is then decompressed by the printer prior to being made into a hard copy. During compression, the particular format representation often subsamples chrominance images with respect to the luminance image. In normal continuous tone images, the distortions due to subsampling of the chrominance values are not visible to the eye. Additionally, when high resolution text is inserted into the continuous tone images, the sharpness of the black, grey and white text is not affected. However, when chromatic text contains saturated colors, e.g., red, green, blue, cyan, magenta and yellow (RGBCMY), the chromatic blur is visible. The chromatic blur visibility, however, is dependant on the grey level and is most visible on white, and not visible at all with chromatic text on black backgrounds.

The applicable visual theory predicts that the chromatic band width reduction should not be visible, however, this theory fails in the case of saturated color text on light backgrounds. The theoretical band width reduction of chrominance signals is based on the reduced bandwidth of the C1 and C2 contrast sensitivity functions (CSF), which are valid for threshold values. Switkes, et al., *Contrast Dependence and Mechanism of Masking Interactions Among Chromatic and Luminance Gradings*, J. Opt. Soc. Am. A., Vol. 5, No. 7, July 1988, page 1149, found that cross luminance interactions having high contrast luminance signals actually facilitate, i.e. reduces the threshold, of chrominance signals. This appears to be the cause of chromatic blur in the preceding scenario.

SUMMARY OF THE INVENTION

The method for improving chromatic text resolution includes operating on a color image signal that is separated into chrominance (C1, C2) image signal components and a luminance (L) image signal component. A mask is created for a selected image object from the luminance image signal components. The C1 and C2 image signal components are modified by the mask into new image signal components, $C1_{NEW}$, $C2_{NEW}$, respectively. The new image signal components are transformed, with L, into a new color image signal that does not have chromatic blur. In the event that the initial color image signal is in a RGB or CMYK color representation format, the signal is transformed into the L, C1, C2 format, and transformed back into the RGB or CMYK color representation format at the end of the process.

It is an object of the method to provide improved resolution of saturated color text on a light background.

Another object of the invention is to provide such improved resolution in a computationally efficient manner.

A further object of the invention is to eliminate spurious, halo-producing chrominance values which occur as the result of subsampling during a decompression process.

These and other objects and advantages of the invention will become more fully apparent as the description which follows is read in conjunction with the drawings.

DETAILED DESCRIPTION OF THE PREFERRED EMBODIMENT

Figure 1:
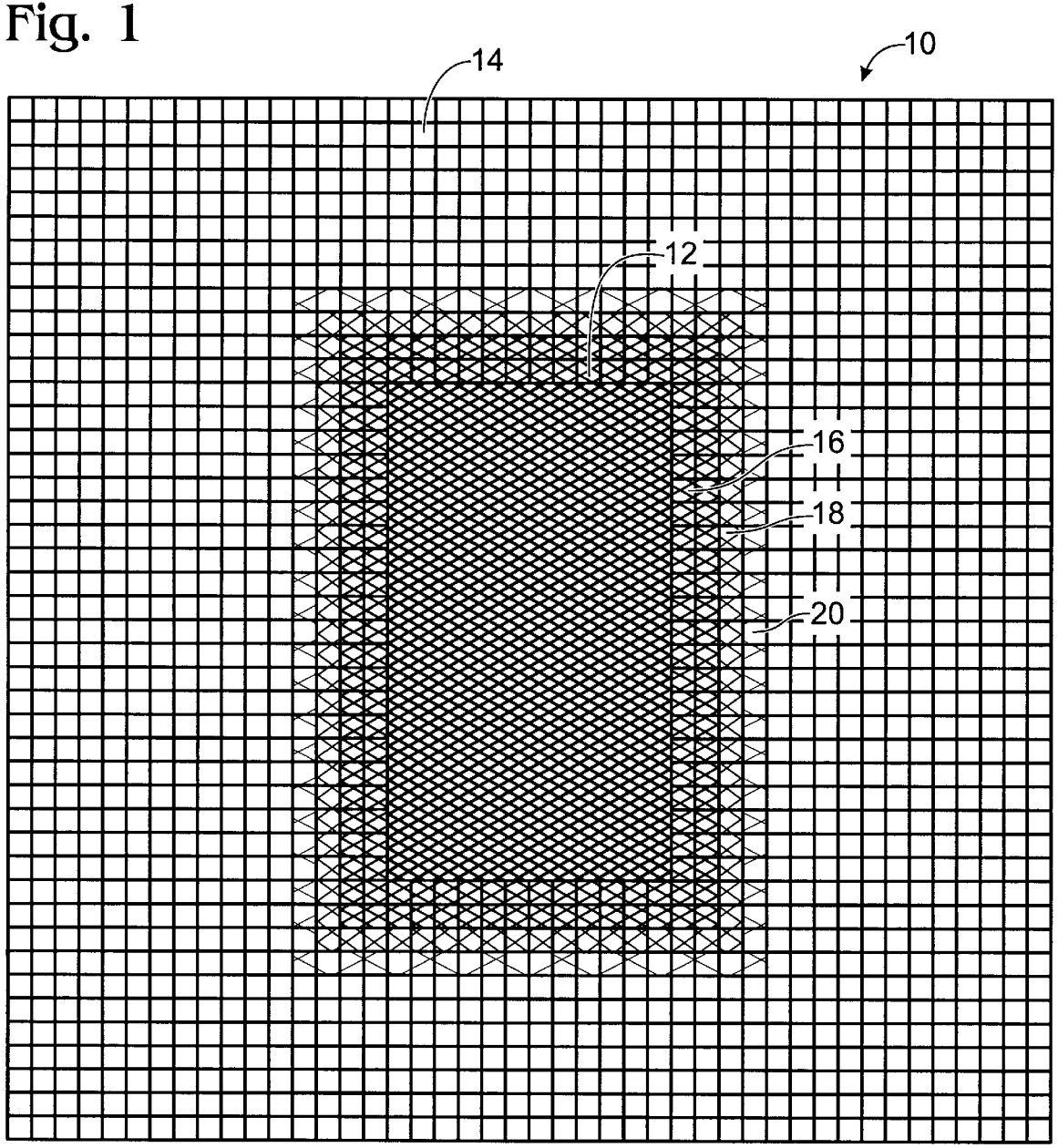
FIG. 1 depicts chromatic blur in an image.

This disclosure deals with using the luminance signal as a control for the processing of chrominance signals in order to prevent chromatic blur. Turning initially to FIG. 1, a portion of a digitized image is depicted generally at 10. Each block on the grid represents a single pixel of the image. In this case, an object 12, which may be text, for example, occupies a number of pixels in the grid. Object 12, for purposes of this discussion, is considered to be a saturated color, i.e. red, green, blue, cyan, magenta, or yellow (RGBCMY) which is displayed on a white (W) background 14. As previously noted, any color system, such as RGB, CMYK. L*a*b*, YUV, or YIQ, for example, may be used and provide the initial signal which results in image 10. Object 12, as depicted, has been generated by some form of digitizer, or graphic rendering process, has been compressed, with a process using chromatic bandwidth reduction, and then decompressed into the depicted object. In chromatic bandwidth reduction, a color image signal representative of the object is originated in a RGB, and/or CMY and black (K) and white (W) format, converted to, for instance, an L*a*b* format, or other format for compression and transmission. It is then converted back to the RGB and/or CMYK format for printing or display. The decompression step requires interpolation of the subsampled or otherwise bandwidth-reduced chrominance values to determine the specific chrominance for a given pixel. Other bandwidth reduction may comprise simple filtering, such as is done in the NTSC and PAL video standards. As a result of the subsampling, compression and decompression, a certain amount of chromatic blur, represented by halo areas 16, 18, and 20 is present. For high image quality, however, there should be a distinct break in the color area, i.e., there should be saturated color in one pixel at the edge of the object 12, and pure white in the next pixel.

Figure 3:
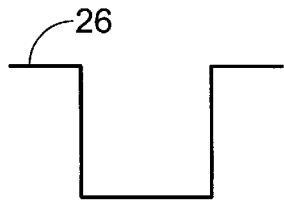
FIG. 3 is a graphical representation of a chrominance image signal.
Figure 4:
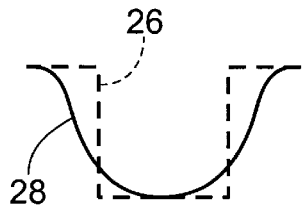
FIG. 4 is a representation of the signal of FIG. 3 after subsampling and interpolation back to its initial resolution.
Figure 2:
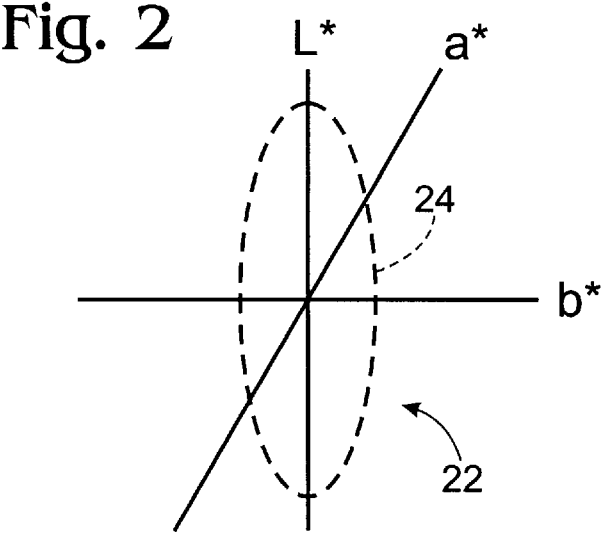
FIG. 2 depicts the L*a*b* color paradigm.

In order to understand the origins of the chromatic blur depicted in FIG. 1, and now referring to FIG. 2, a three axes representation is depicted generally at 22. The vertical axis represents luminance (L*) and has arbitrarily assigned values 0 to +1. The two horizontal axes represent the two components of chrominance and are represented by a* and b*. The intersection of the axes is the value of zero for the two chrominance components. As depicted, the signal for a white object will have a luminance value of plus one and a* and b* values of zero. As the three-dimensional color envelope, or gamut, 24 expands outward from the L* axis, color appears in the image. Returning now to FIG. 1, the result of decompressing the compressed signal is the generation of blurred, or halo, regions 16, 18 and 20, which should have zero values for a* and b* and a plus one value for L. As the result of subsampling, spurious values for a* and b* are assigned to the pixels in blur areas 16, 18 and 20, during decompression. As depicted, greater magnitudes for a* and b* appear in blur areas 16, which values decrease towards area 20. FIG. 3 represents a chromatic, e.g., either a* or b*, signal values for object 12, at line 26, as the value should appear after decompression. FIG. 4 represents the actual signal values following decompression, at line 28, which results in the halo effect shown in FIG. 1. The basic concept of the method of the invention is to detect pixels which should contain, or represent, a white area, or background, which have chrominance values inconsistent with the presence of a white area, which result in the chromatic blur, and to eliminate the spurious chrominance signals. This is done by manipulating the chrominance values as a function of the value of the luminance signal.

Specifically, the range of the absolute value of the magnitude of the chrominance signals is limited according to the luminance level. This technique is viable because the color gamut 24 in the luminance-chrominance space narrows to a point at the minimum and maximum luminance values, as shown in FIG. 2. Again referring to FIG. 2, it is seen that as the luminance goes towards either black (K) or white (W), the color envelope approaches the L* axis, denoting the absence of color. Specifically, the values are zero for both chrominance signals at the luminance minimum and maximum. When a chromatic text character, or line art, on a black or white background, is chromatically blurred, the text is surrounded by values of chrominance that are inconsistent with the luminance values. When the conversion is made from the luminance-chrominance color representation back to a RGB or CMYK representation during decompression or rendering, the inconsistent luminance and chrominance values lead to a luminance change as the out-of-gamut color is mapped orthogonally to the surface of the color gamut. This luminance change creates halos, or color bleeding, around chromatic text, as shown in FIG. 1, which is prevented by the method of the invention.

Because the most noticeable form of chromatic blur is in the situation where chromatic text is placed on a white background, color bleeding may be removed from the chromatic characters using the method of the invention. In a white pixel, both chrominance signals should be zero, and the method forces the chrominance values to zero if the control signal from the luminance indicates that the pixel is white. This analysis is done on a pixel-by-pixel basis. The consequence is that a spatial resolution enhancement in chromatic text is achieved without resorting to the use of spatial operators. Hence, the method of the invention is computationally efficient. The method is essentially a point-processing scheme across L, C1 and C2, which are the luminance and chrominance signal components. This is a computationally inexpensive, efficient method, especially when compared with other spatial resolution approaches, such as filtering.

Figure 5:
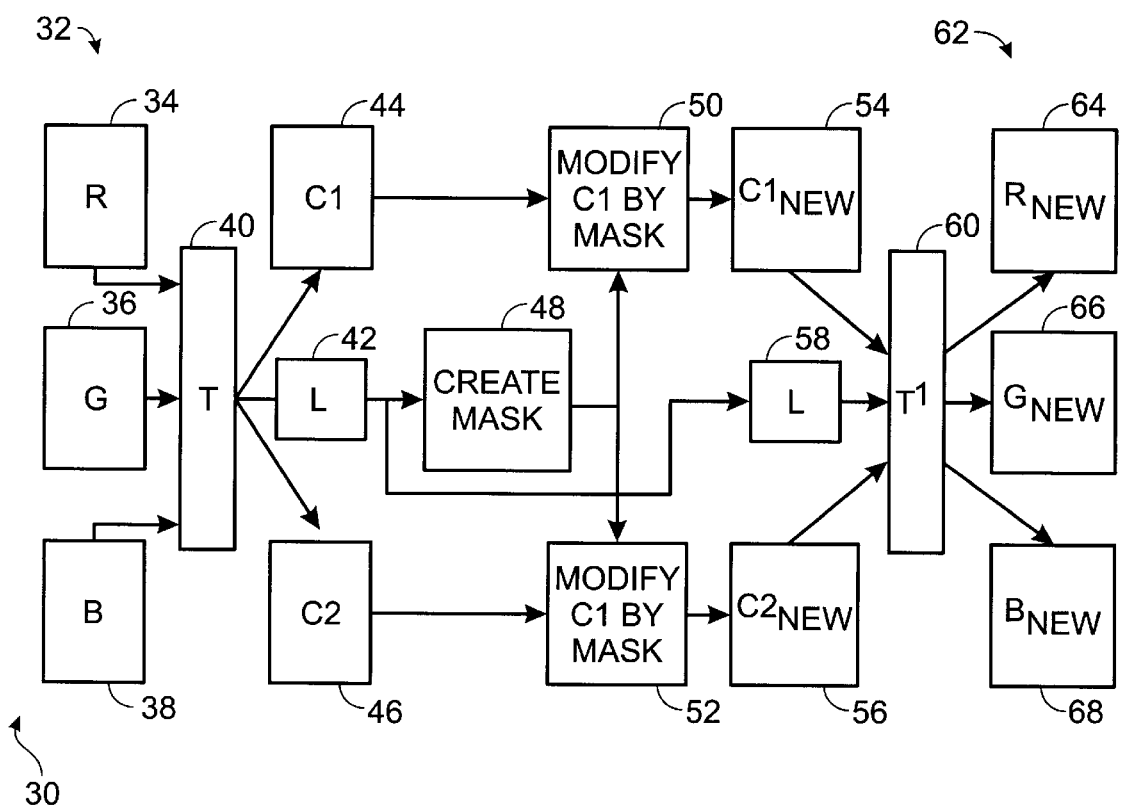
FIG. 5 depicts the initial embodiment of the method of the invention.

Referring now to FIG. 5, the method of the invention is depicted generally at 30. The method, and variations thereof, result in a limit on the range of the absolute value of the chrominance image signal components as a function of the value of the luminance image signal component. To practice the method, a color image signal, depicted generally at 32, including a red component 34, a green component 36, and a blue component 38, is provided. Signal 32 is transformed, block 40, by conventional transformation algorithm T into a luminance image signal component (L) 42 and a pair of chrominance image signal components 44,46 (C1, C2). Signal 42, 44 and 46 are the result of a signal compression step, a transmission or storage step and a decompression step, which decompression step includes subsampling. As previously noted, it is during the subsampling that the image signal acquires spurious chromatic blur signals.

Next, a mask is created from the luminance image signal component, block 48. The mask is created by determining whether the luminance value for a particular pixel indicates whether the pixel should be a white area or not.

Once the mask is created, the values of C1, C2 are modified, blocks 50, 52, which result in $C1_{NEW}$, block 54, and $C2_{NEW}$, block 56, respectively. The value of L* is passed through unchanged, block 58. The inverse of the transform ($T^{-1}$) of block 40 is applied to the image signal components, block 60, which results in a new image signal, shown generally at 62, which includes a new red component, $R_{NEW}$, block 64, a new green component, $G_{NEW}$, block 66, and a new blue component, $B_{NEW}$, block 68. The method is performed in an analogous manner for the CMYK color system, or for any other color system.

Figure 6A:
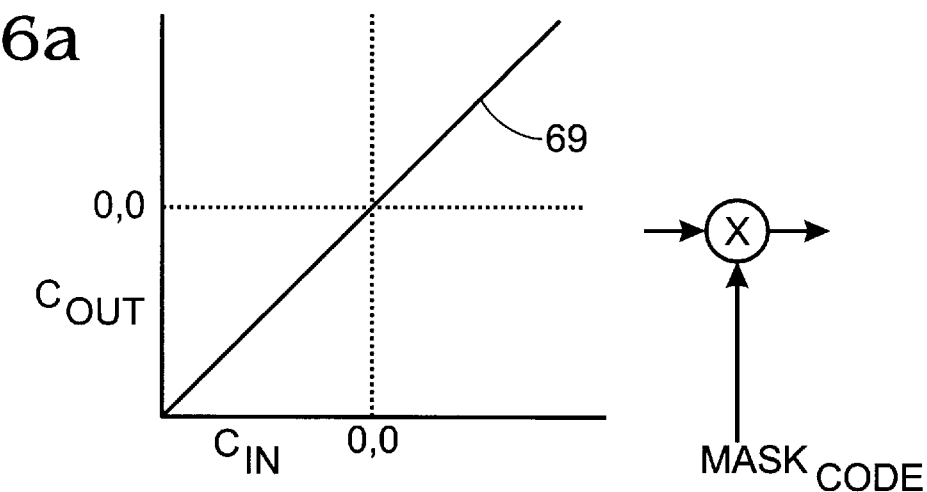
FIG. 6a represents the chrominance input and output signal used in the invention.

Referring now to FIG. 6, the details of the processing in the modification of the chrominance images is shown in greater detail. As shown in FIG. 6a, $C_{out}$ is as function of $C_{in}$, in this case a linear function which is multiplied by the Mask$_{code}$. The most computationally efficient embodiment of the mask is to merely scale the chrominance signal about zero, i.e., where the image is achromatic black-grey-white, by the mask which is represented by the solid line at 69 in FIG. 6a.

Figure 6B:
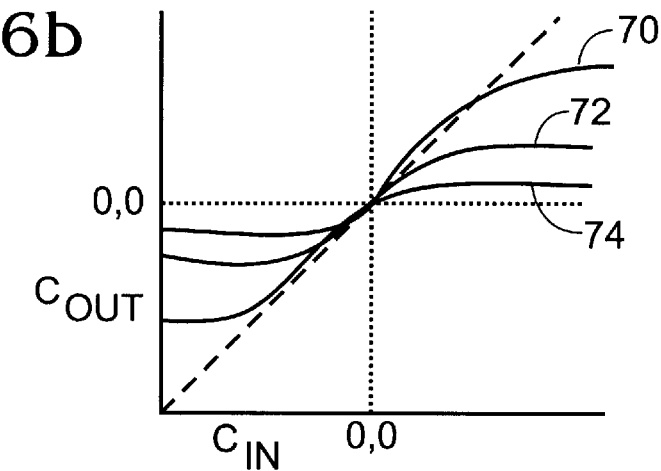
FIG. 6b represent an alternate of modifying the chrominance signal by a mask of the invention.

A more sophisticated approach, and one which is only slightly less computationally efficient, is to use the mask to control the degree of limiting, which is accomplished by using the solid line transfer function of FIG. 6a on the chrominance signal prior to the multiplication by the mask. The chrominance images, C1$_{NEW}$ (54), and C2$_{NEW}$ (56) are determined by the equation:

$$C_{out} = C_{in} * C_{mod} \tag{1}$$

where $C_{mod}$ is the non-linear transfer curve depicted in FIG. 6b. Mask$_{code}$ is depicted in FIG. 6b as line 70, which is scaled by k, to control the maximum and minimum value of $C_{out}$, as represented by lines 70, 72, 74, respectively.

$$C_{out} = C_{in} \text{ if } |C_{out}| < k * Mask_{code} \tag{2}$$

$$= k * Mask_{code} \text{ if } |C_{out}| \geq k * Mask_{code} \tag{3}$$

This alternate method modifies the input/output chrominance relationship by a Mask$_{code}$ control signal. It is nonlinear, and cannot be summarily described simply as a multiplication. The modification affects the input/output transfer function such that, for input chrominance values near zero, the chrominance signals are unchanged, while for higher chrominance values, the mask acts as a limiter.

Figure 8:
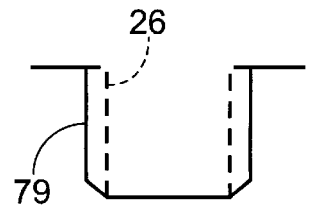
FIG. 8 is a representation of the subsampled signal of FIG. 2 after being subjected to a threshold technique.
Figure 7:
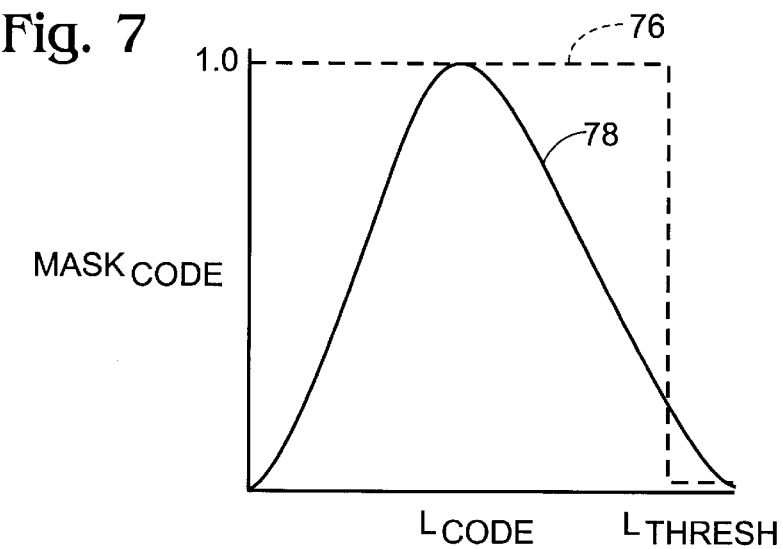
FIG. 7 represents alternate methods of generating the mask from the luminance image.

Referring now to FIG. 7, the steps for generating the masking control signal, step 48 of FIG. 5, wherein the mask is generated from the luminance image signal component, will be explained. There are two ways to generate the mask. Dashed line 76 creates a simple threshold signal with binary values of zero and one. The threshold value is chosen so that the chrominance signal will only be affected in the brightest parts of the image, where the chromatic blur is most visible, and most likely to occur. One way to accomplish this analysis is to apply a threshold, also referred to herein as a predetermined value, operative to the luminance value and, if the threshold is exceeded, the mask is set to change the chrominance values to zero, i.e., no color. However, there may still remain a slight halo about the object using this approach, for example, where the L* value is slightly less than the threshold. The result of using this technique is depicted in FIG. 8, wherein line 79 indicates that there will still be some chromatic blur about the image, however, a large portion of the chromatic blur will be eliminated.

Referring again to FIG. 7, solid line 78 represents a scaled mask which can reduce chromatic blur throughout the entire range from black to white. This results in the reducing of the absolute values of the C1 and C2 signal values toward zero because the mask value is less than 1.0, and the chrominance signal is scaled by the mask signal, as in FIG. 6a, or limited by the mask signal, as in FIG. 6b. Line 78 results in a mask signal that attempts to track the maximum chromatic extent as a function of luminance, in accordance with the overall color gamut possible at the output. The purpose of providing different thresholds, or Mask$_{code}$ curves is to provide for a more accurate shaping of the plausible color gamut as a function of the luminance level. Although the gamut is depicted as elliptical and symmetrical in FIG. 2, it is generally non-symmetrical, and its shape depends on the printer or display. For example, the gamut usually has a wider excursion towards yellow (~C2+) in the light end of L*, and a wider excursion towards blue (~C2−) in the dark end of L*.

Figure 9:
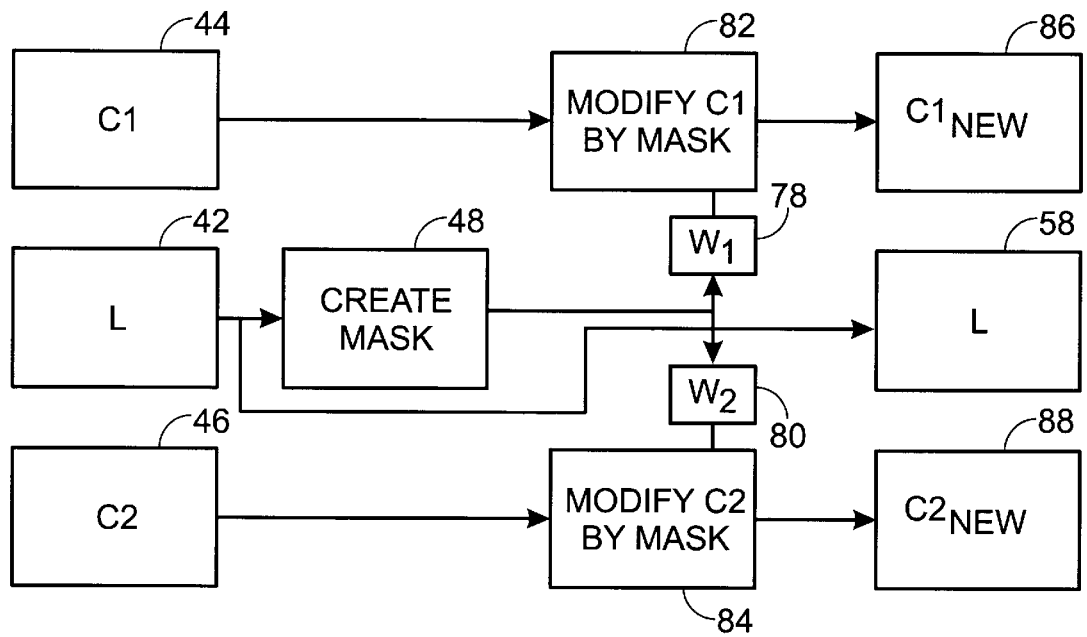
FIG. 9 depicts a portion of the method of the invention having differential weights applied to the mask thereof.

Referring now to FIG. 9, the mask that is created, block 48, is modified by weights, 78, 80, which are a function of the effect of the mask signal which allows the mask signal to be applied differentially to signal C1, C2, thereby differentially modifying C1 and C2, steps 82, 84, resulting in C1$_{NEW}$, block 86 and C2$_{NEW}$ block 88 respectively. L, block 58, is unchanged. Chrominance signals 86 and 88 and luminance signal 58 are then inversely transformed, resulting in a new color image signal.

Figure 10:
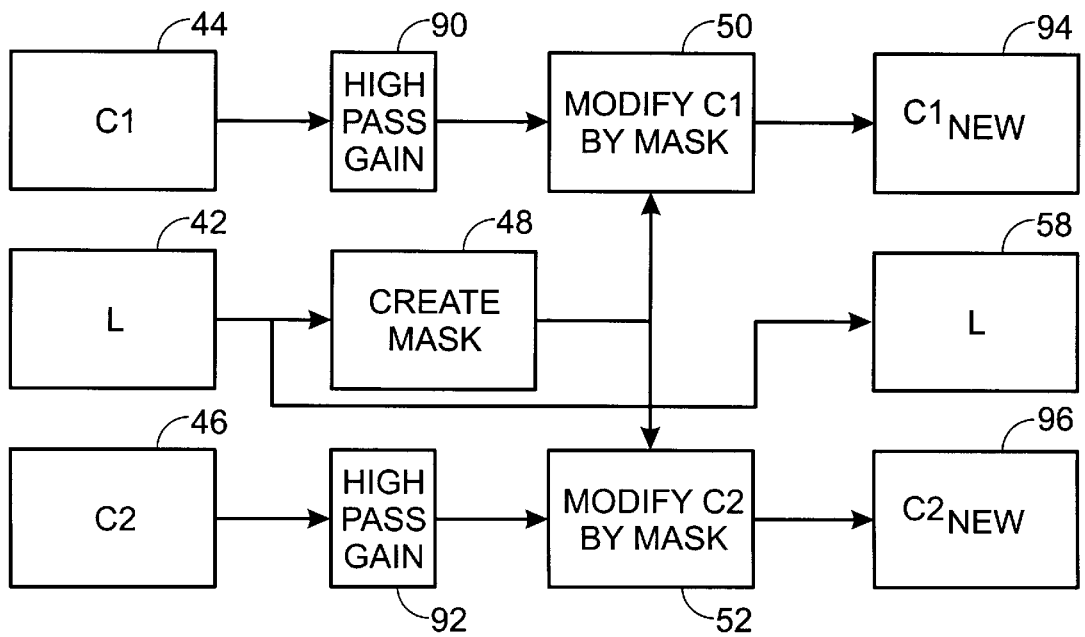
FIG. 10 represents another embodiment of a portion of the invention modified by a high-pass enhancement.

Referring now to FIG. 10, another embodiment of the method is shown, wherein the chrominance image signal components are passed through a high-gain filters, blocks 90, 92, respectively, before being modified by the mask, blocks 50, 52, and resulting in new chrominance signals, block 94, 96, respectively. Again, the luminance and the new chrominance image signal components are inversely transformed into RGB output as a new color image signal. It is important that the high-pass filter step be placed before the modification step, as filtering after the modification step may result in a ringing of the chrominance values.

Figure 11:
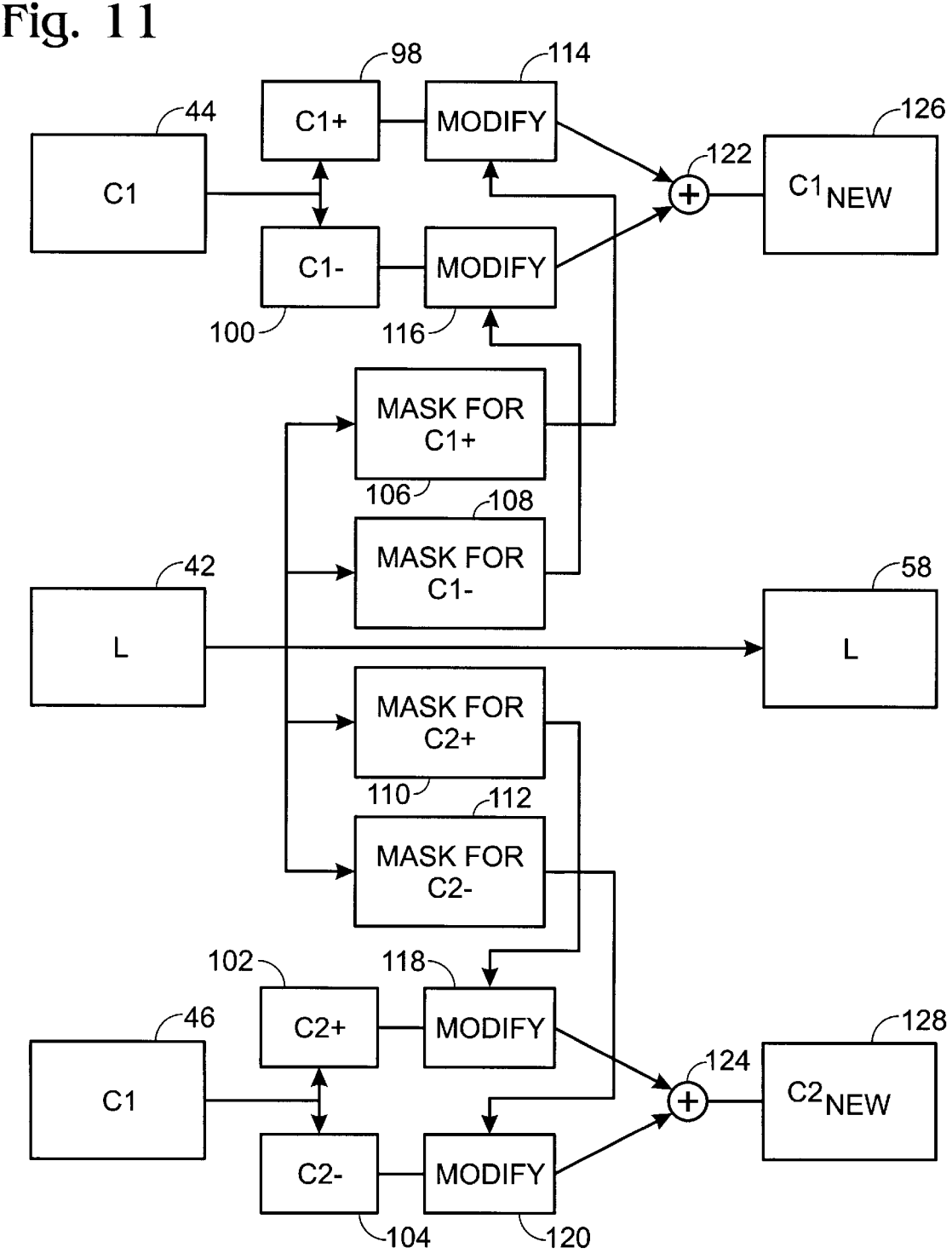
FIG. 11 represents a portion of the method of the invention wherein different mask signals are generated for the plus and minus directions of C1, C2.

Another variation on the method is shown in FIG. 11. In this embodiment of the method, which provides the most control over the signals, chrominance image signal component 44 is split into two components; C1+, block 98, which includes the chrominance signals for C1 which are greater than or equal to zero, and C1−, block 100, which includes the chrominance signals for C1 which are less than zero. Likewise, chrominance signal C2 is split into C2+, block 102, and C2−, block 104. In this embodiment, plural masks are formed, one for each of the chrominance signals, i.e., there is a mask for each of C1+, block 106, C1−, block 108, C2+, block 110, and C2−, block 112. The C1+ signal is modified block 114, by the mask for C1+, and like modifications, blocks 116, 118, and 120 are performed on the other chrominance signal components. The now modified chrominance signals are combined, blocks 122, 124 into C1$_{NEW}$, block 126, and C2$_{NEW}$, block 128, and combined with luminance signal component 58 into a new color image signal.

It should be appreciated that the method disclosed herein, and the variations thereof, may be practiced alone, or in combination, as desired.

Thus, a method for eliminating chromatic blur, and several variations thereof, has been disclosed. It should be appreciated that further variations and modifications may be made thereto without departing from the scope of the invention as defined in the appended claims.

We claim:

1. A method for improving chromatic text resolution, comprising:

creating a mask for a select image object from the luminance image signal component from a color image signal having a luminance image signal component (L) and chrominance image signal components (C1, C2) to determine whether a pixel is outside a graphical element;

limiting the range of the absolute value of the chrominance image signal component as a function of the luminance image signal component during mask creation;

modifying C1, C2, by the mask into C1$_{NEW}$, C2$_{NEW}$, image signal components, respectively; and transforming C1$_{NEW}$, C2$_{NEW}$, and L* into a new color image signal.

2. The method of claim 1 which includes transforming a color image signal into chrominance (C1, C2) image signal components and luminance (L) image signal component.

3. The method of claim 1 wherein creating the mask includes providing a weighted function for the mask for each chrominance signal component.

4. The method of claim 1 which includes passing C1, C2 through a selected high-pass filter prior to said modifying.

5. The method of claim 1 which includes splitting C1 and C2 into positive and negative components prior to said modifying.

6. The method of claim 1 wherein said modifying the chrominance image signal components includes setting the chrominance image signal components to zero when the luminance image signal component is greater than a predetermined value.

7. A method for improving chromatic text resolution for a saturated color text object on a white background, comprising:

transforming a color image signal, pixel-by-pixel, into chrominance (C1, C2) image signal components and luminance (L) image signal component;

creating a mask for a select image object from the luminance image signal component, wherein the mask has a value of "1" or "0" to determine whether a pixel is outside a graphical element;

limiting the range of the absolute value of the chrominance image signal component as a function of the luminance image signal component during mask creation:

modifying C1, C2, by the mask into $C1_{NEW}$, $C2_{NEW}$, image signal components, respectively; and transforming $C1_{NEW}$, $C2_{NEW}$, and $L^*$ into a new color image signal.

8. The method of claim 7 wherein creating the mask includes providing a weighted function for the mask for each chrominance signal component.

9. The method of claim 7 which includes passing C1, C2 through a selected high-pass filter prior to said modifying.

10. The method of claim 7 which includes splitting C1 and C2 into C1+, C1− and C2+, C2−, respectively prior to said modifying.

11. The method of claim 7 wherein said modifying the chrominance image signal components includes setting the chrominance image signal components to zero when the luminance image signal component is above a predetermine value.

12. The method of claim 7 wherein said creating a mask includes setting the value of the mask to 1 or zero.

13. The method of claim 1 wherein said modifying includes modifying C1, C2 pixel-by-pixel.

* * * * *